United States Patent
Klop et al.

(10) Patent No.: US 10,183,573 B1
(45) Date of Patent: Jan. 22, 2019

(54) VEHICLE GRILLE FLOW CONTROL ASSEMBLY AND METHOD

(71) Applicant: Ford Global Technologies, LLC, Dearborn, MI (US)

(72) Inventors: Aaron Peter Klop, Bloomfield Hills, MI (US); Colin Christopher Nitroy, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/652,429

(22) Filed: Jul. 18, 2017

(51) Int. Cl.
*B60K 11/08* (2006.01)
*B60R 19/52* (2006.01)

(52) U.S. Cl.
CPC ............ *B60K 11/085* (2013.01); *B60R 19/52* (2013.01); *B60R 2019/525* (2013.01); *B60Y 2400/405* (2013.01)

(58) Field of Classification Search
CPC ....... B60K 11/08; B60K 11/085; B60K 11/04; B60R 19/52; B60R 2019/525; B60Y 2400/405
USPC ................... 180/68.1, 68.2, 68.3, 68.4, 68.6; 810/68.1
See application file for complete search history.

(56) References Cited

U.S. PATENT DOCUMENTS

| | | | | |
|---|---|---|---|---|
| 8,485,296 B2 * | 7/2013 | Charnesky | ........... | B60K 11/085 165/98 |
| 8,550,887 B2 | 10/2013 | Walters | | |
| 8,794,360 B2 * | 8/2014 | Nemoto | ............... | B60K 11/085 180/68.1 |
| 8,794,363 B2 * | 8/2014 | Wolf | .................... | B60K 11/085 180/68.1 |
| 8,915,320 B2 * | 12/2014 | Chinta | ................. | B60K 11/085 180/68.1 |
| 9,168,828 B2 | 10/2015 | Bourqui | | |
| 9,446,660 B2 | 9/2016 | Asai | | |
| 2013/0068403 A1 * | 3/2013 | Fenchak | .............. | B60K 11/085 160/218 |
| 2014/0273806 A1 | 9/2014 | Frayer, III | | |
| 2015/0274002 A1 * | 10/2015 | Vacca | .................. | B60K 11/085 180/68.1 |
| 2017/0021720 A1 | 1/2017 | Anderson et al. | | |
| 2017/0050510 A1 | 2/2017 | Manhire | | |

FOREIGN PATENT DOCUMENTS

KR    20120053116    5/2012

* cited by examiner

*Primary Examiner* — John D Walters
(74) *Attorney, Agent, or Firm* — Carlson, Gaskey & Olds, P.C.

(57) ABSTRACT

An exemplary flow control assembly includes, among other things, a grille member and a flow control device having a plurality of bowed shutters adjacent the grille member. The bowed shutters are configured to move back and forth between a flow permitting position and a flow restricting position. An exemplary flow control method includes, among other things, moving a plurality of bowed shutters back and forth between a flow permitting position and a flow restricting position. The flow permitting position permitting more flow through apertures in a grille member than the flow restricting position.

19 Claims, 5 Drawing Sheets

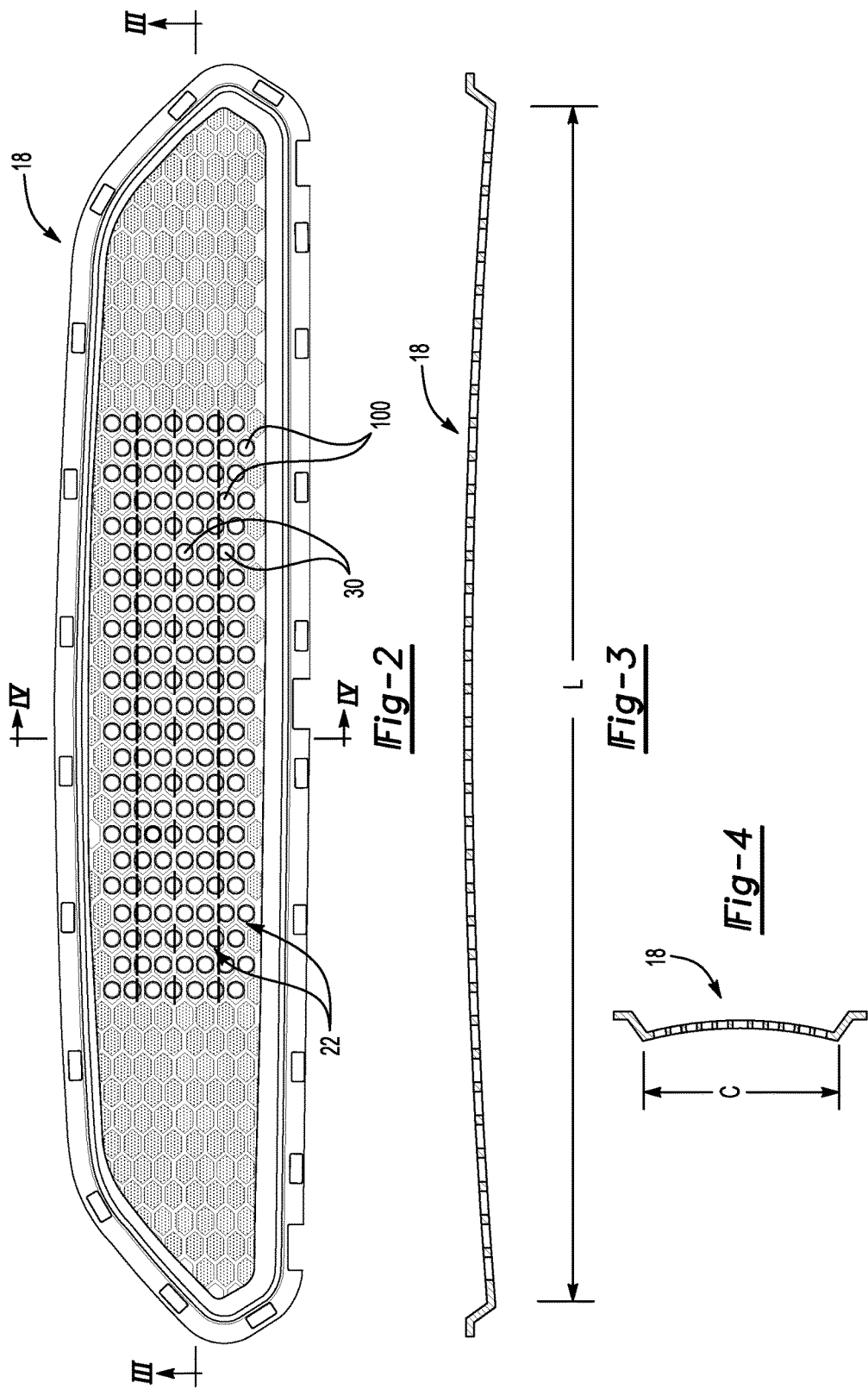

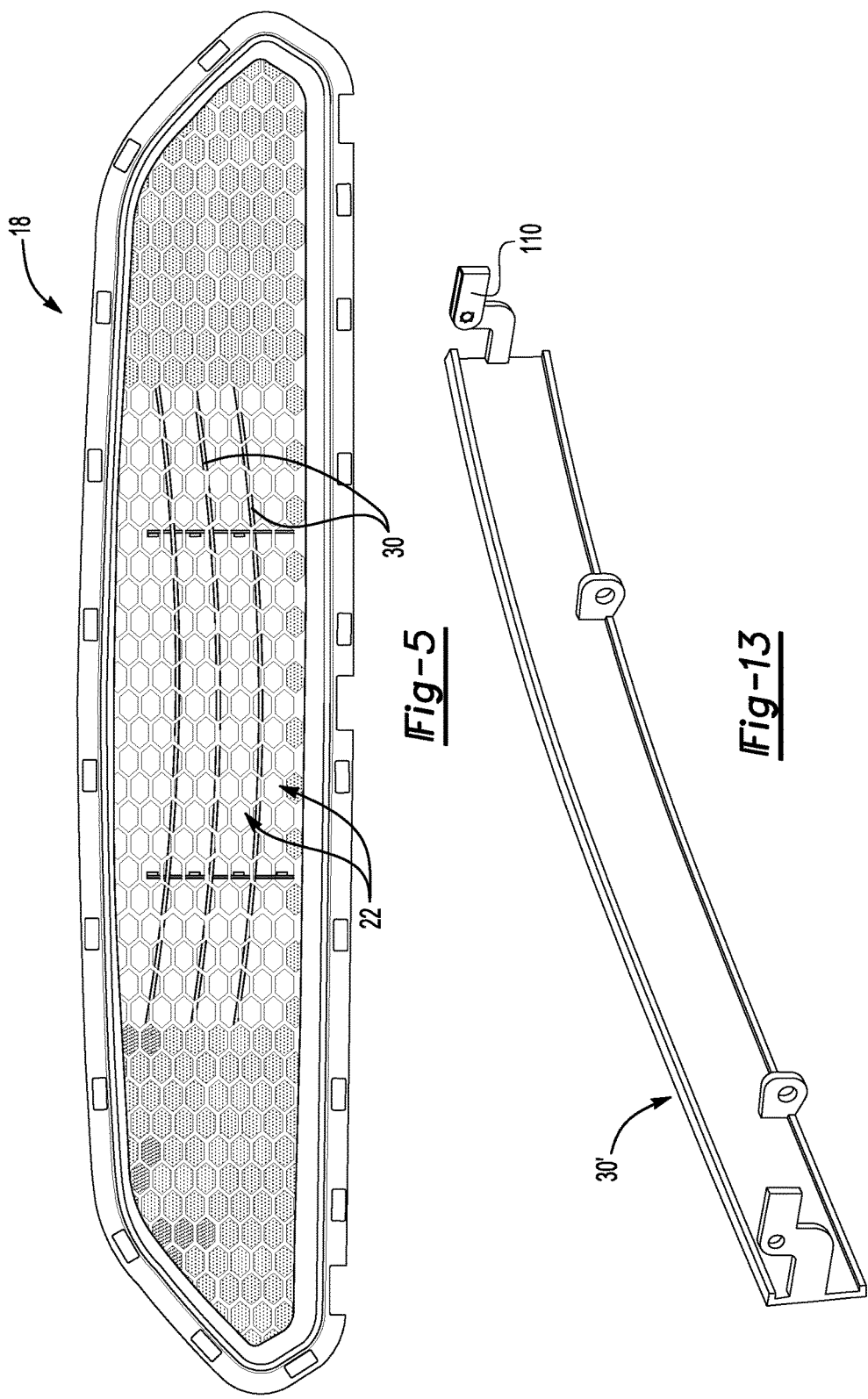

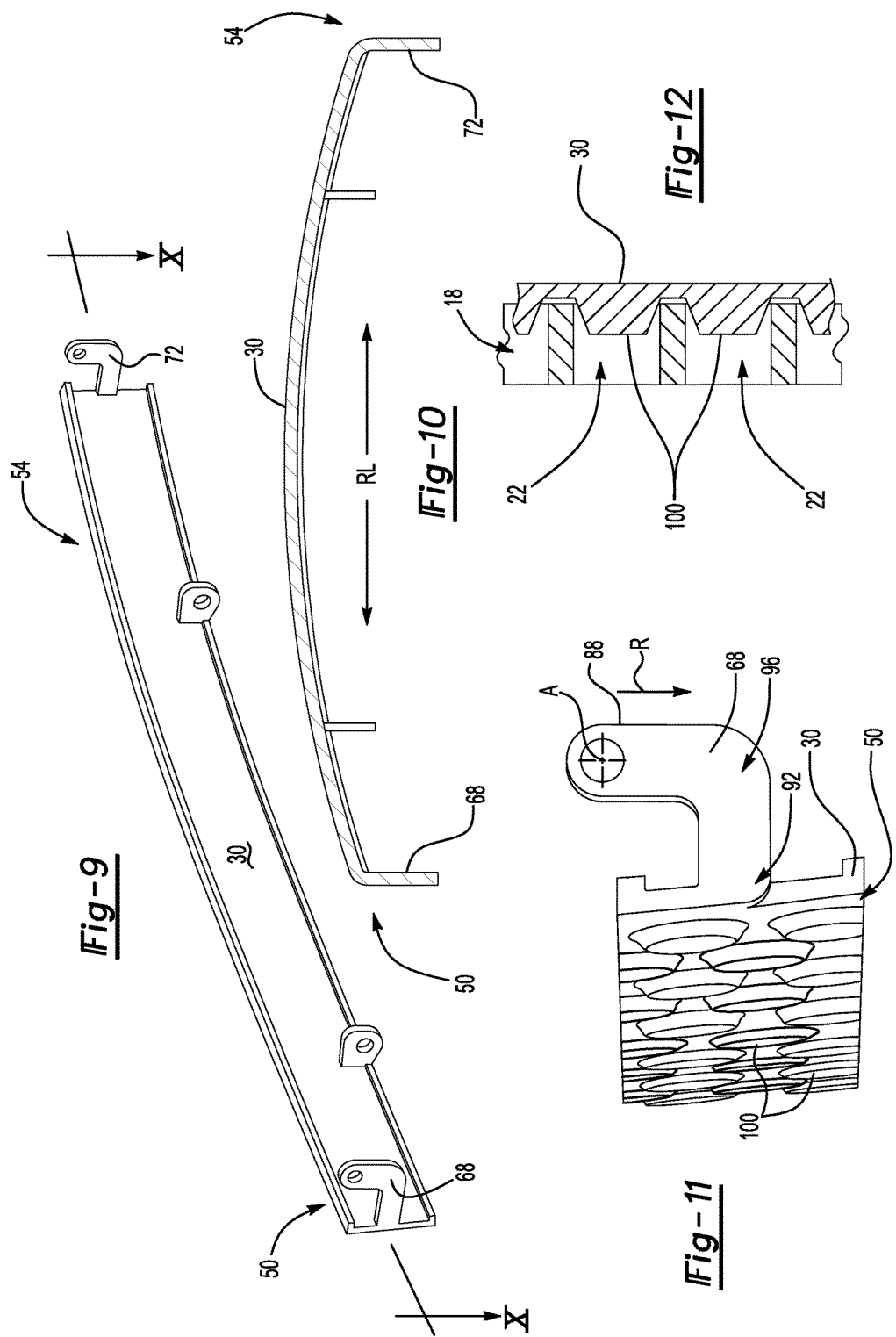

VEHICLE GRILLE FLOW CONTROL ASSEMBLY AND METHOD

TECHNICAL FIELD

This disclosure relates generally to controlling flow and, more particularly, to a flow control assembly with bowed shutters that are actuated to control flow through a vehicle grille.

BACKGROUND

Shutters can be used to regulate flow to various areas of a vehicle, such as radiators, condensers, and other systems. The shutters are actuated to regulate flow. In some vehicles, shutters are actuated to alter aerodynamic drag on the vehicle.

Flow to the shutters can move through a grille. Many grilles have curved surfaces and other complex styling features. The shutters, in contrast to the grille, are planar.

SUMMARY

A flow control assembly according to an exemplary aspect of the present disclosure includes, among other things, a grille member, and a flow control device having bowed shutters adjacent the grille member. The bowed shutters are configured to move back and forth between a flow permitting position and a flow restricting position.

In a further non-limiting embodiment of the foregoing assembly, each of the bowed shutters has a longitudinal section that is curved.

In a further non-limiting embodiment of any of the foregoing assemblies, each of the bowed shutters extends along an arc from a first shutter end portion that is pivotably connected to the grille structure to a second shutter end portion that is pivotably connected to the grille structure.

A further non-limiting embodiment of any of the foregoing assemblies includes hinge members that connect the bowed shutters to the grille member.

In a further non-limiting embodiment of any of the foregoing assemblies, each of the hinge members has a bend connecting a first hinge end portion to a second hinge end portion. The first hinge end portion extends radially from a pivot axis to the bend. The second end portion extends at least partially circumferentially from the bend relative to the pivot axis.

In a further non-limiting embodiment of any of the foregoing assemblies, the first end portion is pivotably coupled to the grille member.

In a further non-limiting embodiment of any of the foregoing assemblies, each of the hinge members has a first hinge end portion and a second hinge end portion. The first hinge end portion is pivotably coupled to the grille member. The second hinge end portion extends nonlinearly from the first hinge end portion.

In a further non-limiting embodiment of any of the foregoing assemblies, the hinge members are a part of the bowed shutters.

A further non-limiting embodiment of any of the foregoing assemblies includes an actuator that rotates a rod to move at least one of the bowed shutters back and forth between the flow permitting position and the flow restriction position.

In a further non-limiting embodiment of any of the foregoing assemblies, the assembly includes a link coupled to each of the bowed shutters such that movement of the one of the bowed shutters by the rod causes each of the bowed shutters to move between the flow permitting position and the flow restricting position.

In a further non-limiting embodiment of any of the foregoing assemblies, the grille member has a longitudinal section that is curved.

In a further non-limiting embodiment of any of the foregoing assemblies, a curvature of each of the bowed shutters mimics a corresponding curvature of the grille member such that the bowed shutters can nest within the corresponding curvature of the grille.

In a further non-limiting embodiment of any of the foregoing assemblies, the flow restricting position includes a closed position, and an extension from at least one of the bowed shutters is at least partially received within an aperture of the grille member when the bowed shutters are in the closed position.

A vehicle according to an exemplary aspect of the present disclosure includes, among other things, the flow control device, and the flow control device is configured to move back and forth between the flow permitting position and the flow restricting position to change an amount of flow that enters an engine compartment through a plurality of apertures in the grille member.

A flow control method according to an exemplary aspect of the present disclosure includes, among other things, moving bowed shutters back and forth between a flow permitting position and a flow restricting position. The flow permitting position permits more flow through apertures in a grille member than the flow restricting position.

In a further non-limiting embodiment of the foregoing method, each of the bowed shutters has a longitudinal section that is curved.

In a further non-limiting embodiment of any of the foregoing methods, the flow restricting position includes a closed position, and the method further includes at least partially receiving an extension from each of the bowed shutters within at least one of the apertures when the bowed shutters are in the closed position.

In a further non-limiting embodiment of any of the foregoing methods, the method includes moving by pivoting the bowed shutters together.

In a further non-limiting embodiment of any of the foregoing methods, the bowed shutters are pivotably attached to the grille member.

BRIEF DESCRIPTION OF THE FIGURES

The various features and advantages of the disclosed examples will become apparent to those skilled in the art from the detailed description. The figures that accompany the detailed description can be briefly described as follows:

FIG. 2 illustrates a front view of the flow control assembly of FIG. 1 with bowed shutters of a flow control device adjacent a grille in a fully closed position.

FIG. 3 illustrates a longitudinal section of the grille taken at line in FIG. 2.

FIG. 4 illustrates a cross section of the grille taken at line IV-IV in FIG. 2.

FIG. 5 illustrates the front view of FIG. 2 with the bowed shutters in a fully open position.

FIG. 9 illustrates a perspective view of a bowed shutter from the flow control device of FIG. 6.

FIG. 10 illustrates a section view taken at line X-X in FIG. 9.

FIG. 11 illustrates a side view of the bowed shutter of FIG. 9.

FIG. 12 illustrates a section view through one of the bowed shutters and a portion of the grille member when the flow control assembly is in the fully closed position of FIG. 6.

FIG. 13 illustrates a perspective view of another shutter of the flow control device of FIG. 6.

DETAILED DESCRIPTION

This disclosure relates generally to controlling flow through a grille utilizing a flow control device having shutters. The grille has curved surface that is adjacent to the bowed shutters. The shutters are bowed to interface with the curved surface of the grille.

Figure 1:
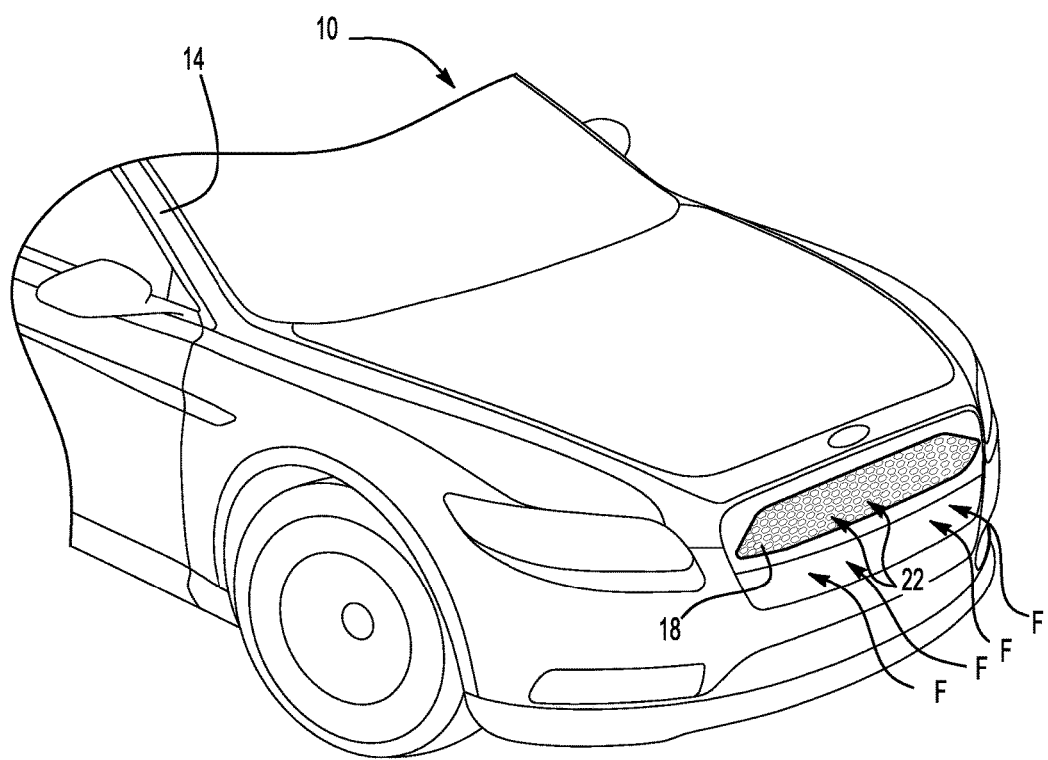
FIG. 1 illustrates a front of a vehicle incorporating a flow control assembly according to an exemplary embodiment of the present disclosure.

Referring to FIGS. 1 and 2, a front 10 of a vehicle 14 includes a grille member 18. A plurality of apertures 22 are provided within the grille member 18. The apertures 22 are hexagonal is this example, but other types of apertures could be provided. Flow F can move through the apertures 22 to, in this exemplary embodiment, an engine compartment of the vehicle 14. Because of the apertures 22, the grille members 18 is sometimes referred to as a mesh grille member.

The grille member 18 is curved. In this example, as shown in FIG. 3, a longitudinal section is curved relative to a linear reference line L. Further, as shown in FIG. 4, a cross section is curved relative to a lineal reference line C. In particular, an area of the grille member 18 providing the apertures 22 has a curve or contour.

The flow F can be used to cool components within the engine compartment, such as an internal combustion engine. From time to time, blocking the flow F to the engine compartment may be desired. For example, blocking the flow F may reduce aerodynamic drag, which may be beneficial for high performance vehicles, as well as vehicles where optimizing fuel efficiency is desired. Electrified vehicles, for example, may block the flow F to reduce aerodynamic drag on the vehicle 14 and thereby enhance an overall fuel efficiency of the vehicle 14.

Referring now to FIGS. 5 to 8 with continuing reference to FIGS. 1 and 2, the exemplary vehicle 14 incorporates a flow control device 26 having a plurality of bowed shutters 30, an actuator 34, an actuation rod 38, and a plurality of coupling members 42. Although the flow control device 26 is shown as used with the grille member 18 at the front 10 of the vehicle 14, the flow control device 26 could be instead used with a grille member in another area, such as the passenger cabin.

Figure 6:
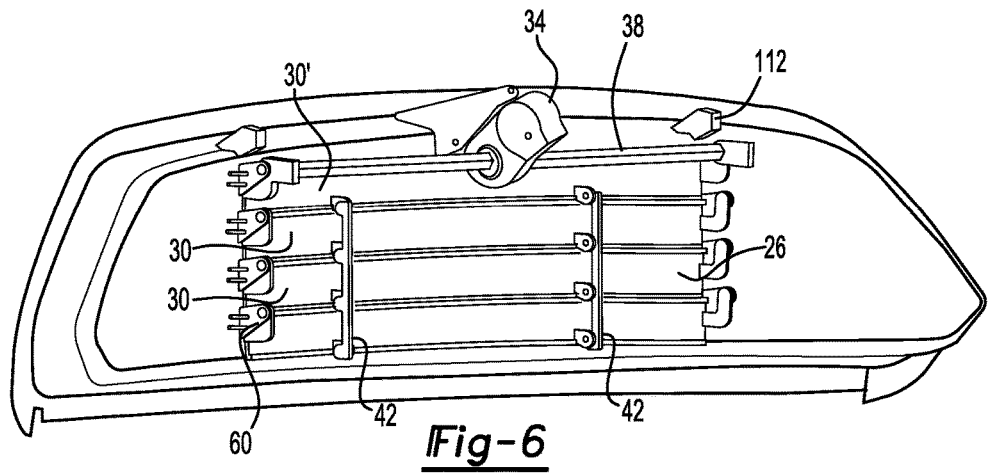
FIG. 6 illustrates a rear view of the flow control assembly of FIG. 1 with bowed shutters of the flow control device in the fully closed position.

In FIGS. 2 and 6, the bowed shutters 30 are in a flow restricting position and, more particularly, in a closed position where the flow control device 26 blocks substantially all flow F through the apertures 22.

Figure 7:
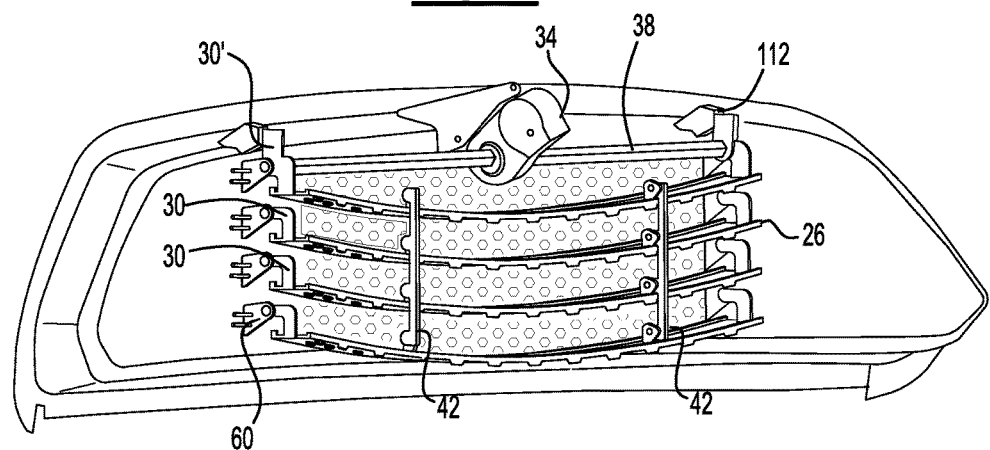
FIG. 7 illustrates the rear view of FIG. 6 with the bowed shutters in a fully open position.

In FIGS. 5 and 7, the bowed shutters 30 are shown in a flow permitting position and, more particularly, a fully open position where the flow control device 26 permits maximum flow through the apertures 22.

Figure 8:
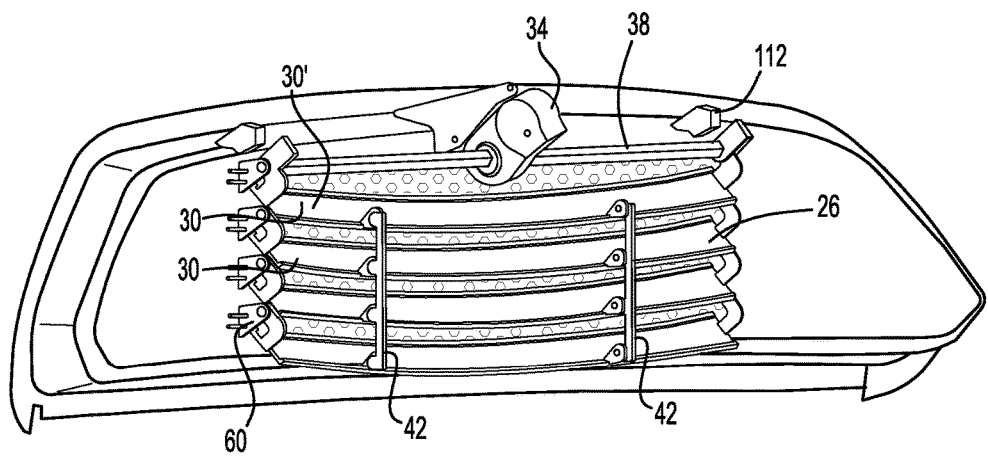
FIG. 8 illustrates the rear view of FIG. 6 with the bowed shutters in a partially open position.

In FIG. 8, the bowed shutters 30 are shown in another flow permitting position between the closed position of FIGS. 2 and 6, and the fully open position of FIGS. 5 and 7.

Flow permitting and flow restricting for purposes of this disclosure refers to positions of the bowed shutters 30 relative to other positions of the bowed shutters. That is, the bowed shutters 30 in FIG. 8 are shown in a flow permitting position relative to the bowed shutters 30 as positioned in FIG. 6, but the bowed shutters 30 as positioned in FIG. 8 are shown in a flow restricting position relative to the bowed shutters 30 as positioned in FIG. 7.

The actuator 34 is electrically powered and configured to rotate the actuation rod 38. An accessory battery of the vehicle 14 could power the actuator 34, for example. Rotation of the actuation rod 38 causes the bowed shutter 30' to rotate. The actuation rod 38 is, in this exemplary embodiment, about 7.5 millimeters in diameter and has a star-drive cross-sectional profile.

The bowed shutter 30' is coupled to the remaining bowed shutters 30 in the plurality of bowed shutters via the coupling members 42. When the actuation rod 38 rotates the bowed shutter 30', the coupling member 42 moves with the bowed shutter 30' to rotate the remaining bowed shutters 30 of the flow control device 26.

The actuator 34 could cause the bowed shutters 30 to rotate in response to a command from a user, or automatically in response to a vehicle condition. For example, if a speed of the vehicle 14 exceeds a threshold speed, a control module of the vehicle 14 may command the actuator 34 to rotate the actuation rod 38 to cause the bowed shutters 30 to move to the position of FIGS. 2 and 6. This positioning of the bowed shutters 30 blocks the flow F through the apertures 22, which can enhance fuel economy by reducing aerodynamic drag on the vehicle 14.

The control module commanding the actuator 34 can be equipped with executable instructions for interfacing with and commanding operation of the flow control device 26. The control module can include a processing unit and non-transitory memory for executing the various control strategies and modes of the flow control device 26. The processing unit, in an embodiment, is configured to execute one or more programs stored in the memory of the control module.

The bowed shutters 30 interface with the area of the grille member 18 providing the apertures 22. Since at least this area of the grille member 18 is curved and nonplanar, the bowed shutters 30 are bowed to facilitate nesting of the bowed shutters 30 within the grille member 18 when the bowed shutters 30 are in the closed position of FIGS. 2 and 6. The nesting of the bowed shutters 30 within the curvature of the grille member 18 can facilitate blocking flow through the apertures 22. If the bowed shutters 30 were planar rather than bowed, there would be gaps between the bowed shutters 30 and the grille member 18 when the bowed shutters 30 were in the fully closed position.

Referring now to FIGS. 9 and 10, the bowed shutters 30 each extend from a first shutter end portion 50 to an opposing, second shutter end portion 54. The bowed shutters 30 are bowed such that a longitudinal section of the bowed shutters 30 is curved. Due to the bowing of the bowed shutters 30, the bowed shutters 30 can be said to extend along an arc from the first shutter end portion 50 to the second shutter end portion 54.

The exemplary longitudinal section of FIG. 10 reveals the curvature of the bowed shutters 30. The curvature or bowing is relative to a reference line RL that extends linearly through the first shutter end portion 50 and the second shutter end portion 54.

The bowed shutters 30 are hingably connected to extensions 60 of the grille member 18. In this exemplary embodiment, the first shutter end portion 50 includes a first hinge member 68 that pivotably connects to one of the extensions 60, and the second shutter end portion 54 includes a second hinge member 72 that connects to another of the extensions 60.

The hinge members 68 and 72, in this example, are formed together with the remaining portions of the respective bowed shutter 30. That is, the hinge members 68 and 72 form a continuous monolithic structure together with the remaining portions of the respective bowed shutter 30.

Referring to FIG. 11 with continuing reference to FIG. 9, the hinge members 68 and 72 each extend from a first hinge end portion 88 to a second hinge end portion 92. A bent portion 96 of the hinge members 68 and 72 connects the first hinge end portion 88 to the second hinge end portion 92.

The first hinge end portion 88 extends radially in a direction R from a pivot axis A extending out of the page in FIG. 11. In this example, the bowed shutters 30 pivot 90 degrees about the pivot axis A when moving from the fully closed position of FIG. 6 to the fully open position of FIG. 7.

The first hinge end portion 88 extends radially in the direction R from the pivot axis A to the bent portion 96. The second hinge end portion 92 extends at least partially circumferentially from the bent portion 96 to the remaining portions of the bowed shutter 30.

Due to the bent portion 96, the hinge members 68 and 72 are sometimes considered a gooseneck-type hinge. The bent portion 96 facilitates movement of the bowed shutters 30 back and forth between the flow permitting and flow restricting positions. If not for the bent portion 96 in the hinge members 68 and 72, the bowed shutters 30 could collide with each other, or significant gaps would be present between the bowed shutters 30. Such gaps could present flow paths even when the bowed shutters 30 are in the closed position.

As shown in FIGS. 11 and 12, the example bowed shutters 30 include a plurality of extensions 100 extending from the remaining portions of the bowed shutters 30 toward the grille member 18 when the bowed shutters 30 are in the fully closed position of FIGS. 2 and 6. The extensions 100 are received at least partially within the apertures 22 when the bowed shutters 30 are in the fully closed position of FIGS. 2 and 6. Generally, the distribution of the extensions 100 corresponds to the distribution of the apertures 22.

The receipt of the extensions 100 within the apertures 22 can enhance the aesthetic appeal of the vehicle 14. The extensions 100 effectively provide a different look for the grille member 18 when viewed from an exterior of the vehicle 14.

Further, in some examples, the extensions 100 could facilitate blocking flow through the apertures 22, such as, for example, incorporating curved areas that redirect flow F away from the bowed shutters 30.

To further aesthetically enhance the grille member 18, the bowed shutters 30 could be chrome-plated or otherwise colored. The grille member 18 would then look different when the bowed shutters 30 are in the closed position verses when the bowed shutters 30 are in the open position.

Referring now to FIG. 13, the exemplary bowed shutter 30' is, in this example, a vertical topmost shutter within the flow control device 26 (FIG. 6). Vertical, for purposes of this disclosure, refers to the general orientation of the vehicle 14 when driving or at rest.

The bowed shutter 30' is configured to directly interface with the actuation rod 38. Additionally, the bowed shutter 30' incorporates a stop 110 that contacts a portion 112 of the grille member 18 when the flow control device 26 has its bowed shutters 30 rotated to the fully open position of FIG. 7. Contact between the stop 110 and the portion 112 stops the bowed shutters 30 from rotating past the position of FIG. 7 to a position where a backside of the bowed shutters 30 could potentially block flow through the apertures 22.

Features of the disclosed examples include a flow control device incorporating a plurality of bowed shutters having a curvature that effectively mimics a curvature in a desired area of a grille member. The mimicking the curvature can facilitate nesting the bowed shutters within the grille member to facilitate blocking flow through apertures of the grille member. If, for example, planar shutters were used instead of bowed shutters, undesirable gaps around the bowed shutters would be introduced when the bowed shutters attempt to fully close off flow through the apertures.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A flow control assembly, comprising:
   a grille member; and
   a flow control device having a plurality of bowed shutters adjacent the grille member, the plurality of bowed shutters configured to move back and forth between a flow permitting position and a flow restricting position, each of the plurality of bowed shutters extends along an arc from a first shutter end portion that is pivotably connected to the grille member to a second shutter end portion that is pivotably connected to the grille member, wherein a curvature of each of the bowed shutters mimics a corresponding curvature of the grille member such that the plurality of bowed shutters can nest within the corresponding curvature of the grille member.

2. The flow control assembly of claim 1, wherein each of the plurality of bowed shutters has a longitudinal section that is curved.

3. The flow control assembly of claim 1, further comprising an actuator that rotates a rod to move at least one of the plurality of bowed shutters back and forth between the flow permitting position and the flow restriction position.

4. The flow control assembly of claim 3, further comprising a link coupled to each of the bowed shutters in the plurality of bowed shutters such that movement of the one of the plurality of bowed shutters by the rod causes each of the plurality of bowed shutters to move between the flow permitting position and the flow restricting position.

5. The flow control assembly of claim 1, wherein the grille member has a longitudinal section that is curved.

6. The flow control assembly of claim 1, wherein the flow restricting position comprises a closed position, and an extension from at least one of the plurality of bowed shutters is at least partially received within an aperture of the grille member when the plurality of bowed shutters are in the closed position.

7. A vehicle comprising the flow control assembly of claim 1, wherein the flow control device is configured to move back and forth between the flow permitting position and the flow restricting position to change an amount of flow that enters an engine compartment through a plurality of apertures in the grille member.

8. A flow control assembly, comprising:
a grille member;
a flow control device having a plurality of bowed shutters adjacent the grille member, the plurality of bowed shutters configured to move back and forth between a flow permitting position and a flow restricting position, the plurality of bowed shutters in the flow restricting position nested with the grille member; and
a plurality of hinge members that connect the plurality of bowed shutters to the grille member.

9. The flow control assembly of claim 8, wherein each of the hinge members in the plurality of hinge members has a bend connecting a first hinge end portion to a second hinge end portion, the first hinge end portion extending radially from a pivot axis to the bend, the second end portion extending at least partially circumferentially from the bend relative to the pivot axis.

10. The flow control assembly of claim 9, wherein the first end portion is pivotably coupled to the grille member.

11. The flow control assembly of claim 8, wherein each of the hinge members in the plurality of hinge members has a first hinge end portion and a second hinge end portion, the first hinge end portion pivotably coupled to the grille member, the second hinge end portion extending nonlinearly from the first hinge end portion.

12. The flow control assembly of claim 8, wherein the plurality of hinge members are a part of the plurality of bowed shutters.

13. The flow control method of claim 8, wherein an extension from at least one of the plurality of bowed shutters is at least partially received within an aperture of the grille member when the plurality of bowed shutters are in the flow restricting position.

14. A flow control method, comprising:
moving a plurality of bowed shutters back and forth between a flow permitting position and a flow restricting position, the flow permitting position permitting more flow through a plurality of apertures in a grille member than the flow restricting position, each of the plurality of bowed shutters extends along an arc from a first shutter end portion that is pivotably connected to the grille member to a second shutter end portion that is pivotably connected to the grille member; and
at least partially receiving an extension from each of the plurality of bowed shutters within at least one of the apertures when the plurality of bowed shutters are in the flow restricting position.

15. The flow control method of claim 14, wherein each of the plurality of bowed shutters has a longitudinal section that is curved.

16. The flow control method of claim 14, wherein the flow restricting position comprises a closed position.

17. The flow control method of claim 14, further comprising moving by pivoting the plurality of bowed shutters together.

18. The flow control method of claim 17, wherein the plurality of bowed shutters are pivotably attached to the grille member.

19. The flow control method of claim 14, wherein the arc of each of the bowed shutters mimics a corresponding curvature of the grille member such that the plurality of bowed shutters can nest within the corresponding curvature of the grille member.

* * * * *